May 6, 1969  YOSHIO HAYASE  3,442,709
LAYER-BUILT ALKALINE CELL
Filed Sept. 13, 1966

INVENTOR.
YOSHIO HAYASE
BY McGlew and Toren
ATTORNEYS

United States Patent Office 3,442,709
Patented May 6, 1969

3,442,709
LAYER-BUILT ALKALINE CELL
Yoshio Hayase, Tokyo, Japan, assignor to Fuji Denki
Kagaku Kabushiki Kaisha, Tokyo, Japan
Filed Sept. 13, 1966, Ser. No. 579,081
Claims priority, application Japan, Oct. 13, 1965,
40/62,415
Int. Cl. H01m 35/04, 23/04
U.S. Cl. 136—6                                    15 Claims This invention relates to layer-built alkaline cells or batteries and their manufacture and, more particularly, to a layer-built alkaline cell or battery capable of safely discharging a gas generated principally upon overcharging or over discharging of the cell, and which is substantially unbreakable even in abnormal use.

Alkaline cells are generally tightly enclosed in a sealing enclosure or casing in order to prevent electrolyte leakage. However, this involves a risk of bursting due to the increasing pressure of hydrogen gas readily generated during abnormal use. Consequently, such alkaline cells have generally been limited to a relatively low voltage due to safety considerations.

Alkaline cells or batteries have also been provided with various means for chemically absorbing gas generated during overcharging or over discharging of the cells or batteries. As a practical mater, however, it is difficult to meet requirements of small size and light weight for an alkaline cell or battery having such absorbing means, because there is a limit to the chemical reaction power of the absorbing means.

Different safety devices for discharging large quantities of generated gases from the cells have been proposed and used, particulary in large-sized cells. However, practical and structural difficulties have been encountered in providing such safety devices for small-sized cells because the safety devices make the small-sized cells highly complicated resulting in defeating the objective of reducing the size, weight and cost of the small-sized cells.

With a view to obviating this difficuty, it has been proposed to bore holes in the cell casing and to provide a cover over the bored casing, or to employ an enclosing container which is capable of readily bursting. Some of these expedients, however, are completely impractical due to leakage of the electrolyte. While the cells mentioned above can be used in so-called layer-built batteries, there is the important disadvanatge of substantially increased cost.

An object of the present invention is to provide a layer-built alkaline cell or battery which is free of the defects of the prior art as mentioned above.

Another object of the invention is to provide a layer-built alkaline cell which is inexpensive, safe and reliable.

A further object of the invention is to provide an improved layer-built alkaline cell, or relatively small size, and taking different shapes or forms, such as cylinders, prisms, or the like, and which is reliable in operation and safe even when wrongly used.

A further object of the invention is to provide a layer-built alkaline cell or battery in which each cell comprises a casing and a cap, the casing and the cap being assembled with the interposition of a packing therebetween which allows a relatively small separation of the casing and the cap, when the pressure of generated gas increases, so that, when the gas pressure exceeds a predetermined value, the gas may be vented.

Another object of the invention is to provide a layer-built alkaline cell of the type just mentioned and including an electrolyte absorbing member provided on the periphery of the cell.

A further object of the invention is to provide a layer-built alkaline cell, of the type just mentioned, and which, together with identical cells, is sealed in an electrolyte proof insulating tubular member with the interposition of elastic inserts providing for the gas to permeate throughout the tubular member, the entire battery being enclosed in a mantle or container.

For an understanding of the principles of the invention, reference is made to the following description of typical embodiments thereof as illustrated in the accompanying drawings.

Figure 1:
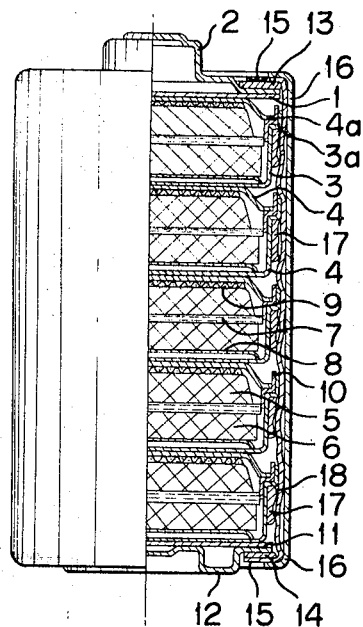
FIG. 1 is a side elevation view, partly in section, of a layer-built alkaline cell embodying the invention.

Referring to FIG. 1, the container of each unit cell comprises a cup-shaped casing portion 3 formed of iron or nickel plated with nickel, silver, cadmium, or zinc. Each cell also includes a cap portion 4 which preferably is formed of the same material as casing portion 3.

To form a layer-built cell or battery, several cell units are superposed upon each other in a manner such that the bottom of casing portion 3 of one unit cell is in electrical connection with the top of the cap portion 4 of the subjacent unit cell. Such electrical connection can be provided directly by spot welding, or may be provided through the interposition of a connector plate. On the bottom surface of casing portion 3 of the lowermost cell unit, there are provided a metal-reinforcing plate 11 and a metal terminal plate 12, which either are connected directly to the bottom surface of the casing portion 3 by spot welding or are electrically connected thereto the interposition of a metal connector plate. The metal reinforcement plate 11 is made or iron plated with nickel, zinc or tin, or may be made of brass, nickel, or stainless steel, and has a higher mechanical strength than the casing portion 3 or the cap portion 4.

Similarly, on the top surface of the cap portion 4 of the uppermost cell unit, there are electrically connected another metal reinforcement plate 1, made of the same material as that of the metal reinforcement plate 11, and a metal terminal plate 2. Again, plates 1 and 2 may be connected directly to the top surface of the cap portion 4 of the uppermost cell unit, as by spot welding, or may be electrically connected thereto with the interposition of a metal connector plate.

An electrolyte absorbing member 17 is disposed peripherally around either casing portion 3 or cap portion 4 of each cell unit. Absorbing member 17 is made of a fibrous material, such as paper pulp, or of felt, sponge rubber, or polyvinyl chloride and, if necessary, is impregnated with an alkaline-neutralizing agent and a hygroscopic agent. The electrolyte absorbing member is secured on the casing portion or the cap portion of the associated cell unit either prior to or after the two portions are connected to each other, this securing being effected by a fastening band 18 which may be a tape, a rubber ring, a thermoshrinking polyvinyl chloride ring, or a metal frame.

Each cell unit includes electrode plates 5 and 6, one of which is an anode comprising principally an oxide, peroxide, or hydroxide of manganese, mercury, or nickel, or silver. Alternatively, it may be made of carbon or nickel. The other electrode plate is a cathode comprising principally a pulverized or porous metal such as pulverized or porous zinc or cadmium, or the oxide of either, or pulverized nickel or copper. The electrode plates are shaped into various forms, as desired, by press molding or by sintering.

The alkali solution, such as caustic potash, used as an electrolyte, is retained in a separator 7 and in perforations or pores of the electrodes 5 and 6. Separator 7 is a colloid-like, paper-like, felt-like, or cloth-like element comprising principally synthetic fiber or cellulose fiber. In order that the electrode plates on opposite sides of separator 7 are fixed in position and kept in good electrical connection with casing portion 3 and cap portion 4, serving as the terminals of a cell unit, a plate-like or net-like connector piece 9 is provided in association, if necessary, with a compression conductor member 8. Connector piece 9 may be formed of nickel or nickel-plated iron, and compression conductor 8 may be made of spring steel or iron plated with nickel, cadmium, or silver.

In accordance with the invention, a packing ring 10 is interposed between casing portion 3 and cap portion 4 of each cell unit. This packing ring may be made of nylon, polyethylene, synthetic rubber, or polyvinyl chloride. Also, there are provided around each terminal plate 2 and 12, adjacent its outer periphery, dielectric inset members 13 and 14 which may be made of pressed board, vulcanized fiber, polyvinyl chloride, or rubber. Preferably, the inset members 13 and 14 comprise laminates of rubber and paper or rubber, paper and plastics. The inset members permit gas discharged from the cell units to pass therethrough, but block leakage of the electrolyte which is discharged in small quantities together with the evolved gas.

The assembly including terminal plates 2 and 12, reinforcement plates 1 and 11 and the stacked cell units is enclosed or enveloped in an alkali-proof dielectric tubular member 15 to prevent leakage of electrolyte. Tubular member 15 may be made of polyethylene, or of thermoshrinking polyvinyl chloride. As will be particularly apparent from FIG. 1, the opposite ends of tubular member 15 are folded in to completely overlie the insert members 13 and 14. In turn, dielectric tubular member 15 is embraced by a metal mantle or outer shell or casing 16, of iron or stainless steel and either coated with paint or electroplated. Both ends of outer shell or mantle 16 are bent inwardly against the inturned ends of the tubular ber 15 are folded in to completely overlie the inset mantle.

The elasticity of inset members 13 and 14, and the clamping force effective at the opposite ends of mantle 16, must be selected to be the optimum with respect to the elasticity and strength of the packing ring 10 of each cell unit so that the insulating or packing rings 10 can prevent the casing portions 3 of the associated cell unit, serving as a terminal of one polarity, and the cap portion 4 of the associate cell unit serving as a terminal of the opposite polarity, from short circuiting while, at the same time, the insulating gaskets 10 serve as safety valves for release of gas evolved in the associated cell units.

In the embodiment of FIG. 1, the peripheral wall of casing portion 3 of each cell is formed with an outwardly and upwardly extending angular offset 3a, and each cap portion 4 is formed with a radially extending peripheral flange 4a. The offset portion 3a extends somewhat above the flange 4a. In this embodiment, insulating gasket 10 is substantially Z-shaped and is seated on the angular offset 3a with the flange 4a seated on the intermediate leg of the gasket 10 and separated by the upper leg of gasket 10 from contact with upwardly extending portion of the offset 3a of casing portion 3. The gasket thus forms a dielectric member preventing contact between casing portion 3 and cap portion 4 while, at the same time, providing for escape of gas evolved in the associated cell unit.

Figure 2:
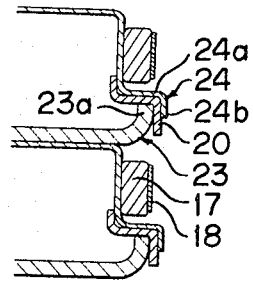
FIGS. 2 through 5 are enlarged partial sectional views of layer-built alkaline cells embodying the invention, and illustrating different arrangements of insulating gaskets between the casings and caps of the cells.

FIGS. 2 through 5 illustrate other dispositions of insulating gaskets 10 with respect to the associated casing portions 3 and cap portions 4. Referring to FIG. 2, casing portion 23 is formed with a peripheral wall 23a which is of relatively low height, and gasket 20, which is again Z-shaped, is seated on the upper end of wall 23a with its downwardly extending leg overlapping the exterior of this wall or rim. Cap portion 24, which is substantially thinner than casing portion 23, has its peripheral wall formed with a radially outwardly extending rim 24a terminating in a downwardly extending flange 24b. Portion 24a overlaps the intermediate leg of gasket 20 and flange 24b partially overlaps the outer surface of the downwardly extending leg of gasket 20, the gasket 20 thus serving to electrically isolate cap portion 24 from casing portion 23.

Figure 3:
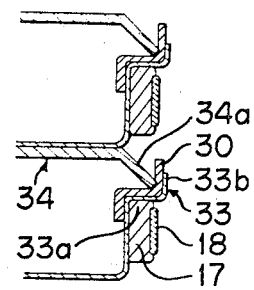

Referring to FIG. 3, relatively thin casing portion 33 has its peripheral wall formed wiht a radially extending ledge 33a terminating in an upwardly extending flange 33b. Z-shaped gasket 30 has its intermediate leg sitting on ledge 33a and its upwardly extending leg extending along the interior surface of flange 33b and also extending substantially above this flange. Cap poriton 34, which is substantially thicker than casing portion 33, is formed with a downwardly and outwardly sloping wall 34a which engages against the interior bend of gasket 30. Again, gasket 30 dielectrically isolates casing portion 33a from cap portion 34a.

Figure 4:
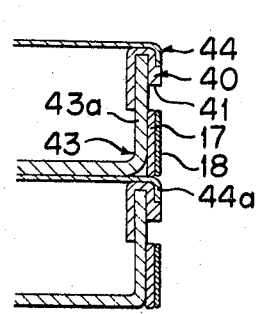

In FIG. 4, casing portion 43 is formed with an upstanding peripheral wall 43a, and the relatively substantially thinner cap portion 44 is formed with a relatively short downwardly extending peripheral wall or rim 44a. Gasket 40 has, in section, a generally inverted J-shape, including a longer leg overlying the inner surface of wall 43a of casing portion 43, and a shorter leg overlying the outer surface of wall 43a and formed with an outturned annular lip 41. The wall 44a of cap portion 44 overlies the outer surface of the shorter leg of gasket 40 and has its end engaging the outturned lip 41 of the gasket. Again, gasket 40 completely isolates casing portion 43 electrically from cap portion 44.

Figure 5:
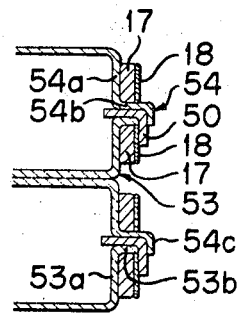

In FIG. 5, both the casing portion 53 and the cap portion 54 are formed of relatively thin material. The upstanding peripheral wall 53a of casing portion 53 is formed with a radially outwardly extending radial flange 53b, and a downwardly extending wall or rim 54 of cap portion 54 is formed with a radial ledge 54b terminating in a downturned lip or flange 54c. In this case, gasket 50 is angular in cross section and has its horizontal leg overlying flange or lip 53b and having its upper surface engaged by ledge 54b. Lip 54c extends downwardly over a portion of the outer surface of the vertical leg of gasket 50. In the arrangement of FIG. 5, the relatively thin material of casing portion 53 and cap portion 54 exerts a relatively weak force against packing ring or gasket 50.

Figure 6:
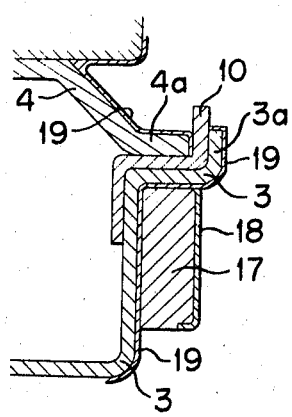
FIG. 6 is an enlarged partial sectional view of an alkaline cell embodying the invention, and incorporating a liquid-repellent coating.

FIG. 6 is an enlarged partial section of another embodiment of the invention in which the construction is essentially the same as that of FIG. 1 and therefore the parts have been given the same reference numerals as in FIG. 1. In the embodiment of FIG. 6, the outer surface, and particularly the peripheries, of casing portion 3 and cap portion 4 are coated with a liquid repellent, alkali-proof layer 19, such as paint, asphalt, or anthrancene oil. By means of this coating, there is obtained the benefits of rapid absorption of any electrolyte discharged from the cell together with evolved gas, the electrolyte being absorbed by the absorbing member 17. Liquid repellent layer 19 has the advantage that any discharged electrolyte flows continuously over packing ring or gasket 10 without being in contact with the metal outer surfaces of the cell unit and thus without constituting an electrical short circuit. Furthermore, liquid repellent layer 19 on the sides or peripheries of reinforcement plates 1 and 11 and terminal plates 2 and 12 will serve to prevent electrolyte from leakage out of the cell. However, in manufacturing the cell of the invention, it is preferable that the quantity of electrolyte in each unit cell does not exceed the absorbing capacity of electrolyte absorbing member 17, insofar as this is possible without influencing the capacity of the cell.

A layer-built alkaline cell or battery of the inventive construction is safe, especially with extremely abnormal use. Because casing portion 3 and cap portion 4 are assembled with the interposition of a packing ring or gasket 10, and are not fastened directly to each other, gas evolved in the unit cell, as its pressure increases, lifts a part of cap portion 4 from packing ring 10 and escapes through the gap thus formed into a space within the dielectric tubular member 15. Any electrolyte discharged together with the escaping gas is absorbed in electrolyte absorbing member 17 surrounding the cell body, so that only gas is discharged through inset members 13 and 14 into the atmosphere. When the gas pressure in the unit cell decreases due to escape of the evolved gas, cap portion 4 regains its original position compressing packing ring 10, owing to the elasticity of inset members 13, 14, or interposed connector members, so that the layer-built cell can be used without fear of failure, for example, due to breakage.

Before the cells embodying the invention are offered for sale, letters, figures or the like can be printed on mantle or container 16, or printed labels of paper or polyvinyl chloride sheet material may be adhered to the mantle. Transparent thermo-shrinking polyvinyl chloride films may also be used for protecting the outer surfaces of the cells. Of course, it is possible to use, in place of reinforcement plates 11, snap or lug-shaped members as terminals.

While specific embodiments of the invention have been shown and described in detail to illustrate the application of the principles of the invention, it will be understood that the invention may be embodied otherwise without departing from such principles.

What is claimed is:

1. A layer-built alkaline cell comprising, in combination, plural cell units arranged in contiguous stacked relation in electrical connection with terminals of corresponding polarity facing in the same direction; each cell unit comprising an electrically conductive metal casing portion forming one cell unit terminal, an electrically conductive metal cap portion forming the other cell unit terminal, a pair of electrodes and an electrolyte encased within the assembled metal cap and casing portions, and a packing ring of dielectric material interposed and under pressure between peripheral portions of said metal casing and cap portions and electrically isolating said metal cell unit portions from each other, said packing ring, upon a predetermined increase in the pressure of gas evolved within the associated cell unit, providing for slight separation of one of said metal cell unit portions from said ring for venting of such gas with substantial restriction of any leakage of electrolyte from within the associated cell unit; a respective electrolyte absorbing member peripherally embracing at least one metal cell unit portion of each cell unit; and electrolyte-proof casing means peripherally embracing and encasing the stacked cell units and restraining outward longitudinal movement of the outwardly facing metal portions of the two end cell units while providing venting of gas from the interior of said casing means.

2. A layer-built alkaline cell, as claimed in claim 1, in which said casing means includes an electrolyte-proof dielectric tubular member embracing said cell units; and an outer casing member peripherally embracing said tubular member.

3. A layer-built alkaline cell, as claimed in claim 1, in which said casing means includes elastic annular members in engagement with said outwardly facing metal portions of the two end cell units and providing such venting of gas from the interior of said casing means.

4. A layer-built alkaline cell, as claimed in claim 1, in which said casing means has inwardly extending flanges at each end overlying said outwardly facing metal portions of the two end cell units; and elastic annular members interposed between each of said end flanges and the adjacent outwardly facing metal portion of an end cell unit, said elastic annular members providing such venting of gas from the interior of said casing means.

5. A layer-built alkaline cell, as claimed in claim 4, in which said casing means includes an electrolyte-proof dielectric tubular member laterally embracing said cell units and having inturned end portions each overlying a respective elastic annular member; said casing means further including an outer casing laterally embracing said tubular member and having inturned end lips each overlying, at least partially, an inturned end portion of said tubular member.

6. A layer-built alkaline cell, as claimed in claim 1, in which said casing and cap portions have peripheral rims extending toward each other; said packing ring being interposed between the facing ends of said peripheral rims.

7. A layer-built alkaline cell, as claimed in claim 6, in which each of said rims is formed with a laterally outwardly extending ledge, one of said ledges having a peripheral lip extending longitudinally and in outwardly spaced relation to the peripheral edge of the ledge of the other rim; said packing ring being angular in section and including a laterally extending leg interposed between the facing surfaces of said ledges, and a longitudinally extending leg interposed between the inner surface of said peripheral lip and said peripheral edge of said other ledge.

8. A layer-built alkaline cell, as claimed in claim 7, wherein said cap portion and said facing portion of each cell unit are formed of material of the same thickness.

9. A layer-built alkaline cell, as claimed in claim 6, wherein one of the casing and cap portions of each cell unit is formed of a material which is substantially thinner than the material of the other portion; each of said portions being formed with a peripheral rim, and said rims extending longitudinally toward each other; the rim of the thinner portion having a laterally outwardly extending ledge terminating in a longitudinally extending lip spaced outwardly from the outermost periphery of the rim of the other portion; said packing ring being angular in cross section and including a laterally extending leg seating on said ledge and a longitudinally extending leg engaging the inner surface of said lip; the rim of the other metal cell portion seating in the inside of said angular cross section.

10. A layer-built alkaline cell, as claimed in claim 9, in which the rim of the thicker metal cell portion extends outwardly at an angle relative to the ledge of said thinner metal cell portion.

11. A layer-built alkaline cell, as claimed in claim 6, in which said gasket is substantially U-shaped in cross section and embraces the rim of one of said metal cell portions; the other metal cell portion overlying the bight of said gasket, with its rim extending longitudinally along the outer surface of said gasket.

12. A layer-built alkaline cell, as claimed in claim 11, in which the material of said other metal cell portion is substantially thinner than the material of said one metal cell portion.

13. A layer-built alkaline cell, as claimed in claim 1, including a pair of electrolyte absorbing members associated with each cell unit, one of said electrolyte absorbing members peripherally embracing the metal casing portion of the associated cell unit and the other electrolyte absorbing member peripherally embracing the metal cap portion of the associated cell unit.

14. A layer-built alkaline cell, as claimed in claim 6, wherein the casing and cap portions of each cell are formed of relatively thin material and exert only a relatively small pressure on the associated packing ring.

15. A layer-built alkaline cell, as claimed in claim 1, including an electrolyte-proof and liquid-repellent material coated on the exterior surface of at least one of the casing portion and cap portion of each cell unit.

References Cited
UNITED STATES PATENTS

| | | | |
|---|---|---|---|
| 2,475,152 | 7/1949 | Rock | 136—111 |
| 2,505,835 | 5/1950 | Richardson et al. | 136—111 |
| 2,774,806 | 12/1956 | Jobe et al. | 136—111 |

WINSTON A. DOUGLAS, *Primary Examiner.*

A. SKAPARS, *Assistant Examiner.*

U.S. Cl. X.R.

136—111